United States Patent [19]

Herliczek et al.

[11] Patent Number: 4,823,511

[45] Date of Patent: Apr. 25, 1989

[54] RETENTION SHIELD WINDOW ASSEMBLY AND METHOD OF MAKING THE SAME

[75] Inventors: Siegfried H. Herliczek, Ida, Mich.; David M. Ginter, El Cerrito, Calif.

[73] Assignee: Libbey-Owens Ford Co., Toledo, Ohio

[21] Appl. No.: 12,726

[22] Filed: Feb. 5, 1987

[51] Int. Cl.$^4$ .............................................. E05D 15/06
[52] U.S. Cl. ...................................... 49/404; 49/374; 49/440; 49/488; 428/83
[58] Field of Search ................ 49/404, 441, 374, 375, 49/501, 502, 348, 349, 440, 488, 350; 428/83, 437; 296/84 R

[56] References Cited

U.S. PATENT DOCUMENTS

| | | | |
|---|---|---|---|
| 3,123,839 | 3/1964 | Reid | 49/488 X |
| 3,162,281 | 12/1964 | Kraska et al. | 49/374 |
| 3,979,548 | 9/1976 | Schafer et al. | 428/437 X |
| 4,046,940 | 9/1977 | Prikkel, III | 49/488 X |
| 4,242,403 | 12/1980 | Mattimoe et al. | 438/437 X |
| 4,370,832 | 2/1983 | Kolke | 49/488 |
| 4,490,942 | 1/1985 | Arnheim et al. | 49/374 |
| 4,543,283 | 9/1985 | Curtze et al. | 428/83 X |
| 4,561,211 | 12/1985 | Raley et al. | 49/374 |
| 4,616,446 | 10/1986 | Okamoto | 49/374 X |
| 4,662,113 | 5/1987 | Weaver | 49/404 |

*Primary Examiner*—Philip C. Kannan
*Attorney, Agent, or Firm*—Marshall & Melhorn

[57] ABSTRACT

A movable window assembly includes a transparent sheet having a retention shield formed of a plastic material. An edge support is formed about at least a predetermined periphery of the transparent sheet and is adapted to cooperate with a channel formed in a vehicle window opening frame to retain the window assembly in the frame when pressure is applied to the window assembly tending to force it out of the frame. The edge support can have a reinforcing core and can be molded in situ on the transparent sheet. In an alternate embodiment, the edge support and the retention shield can be molded on a transparent glass sheet at the same time.

20 Claims, 3 Drawing Sheets

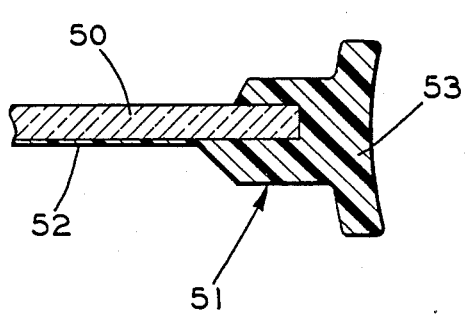
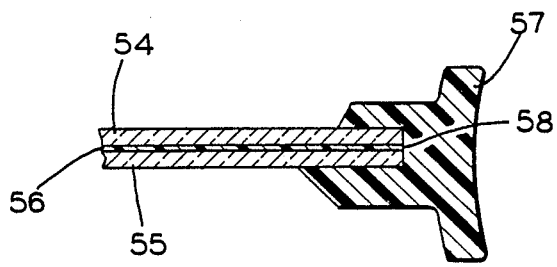
FIG. 8    FIG. 9
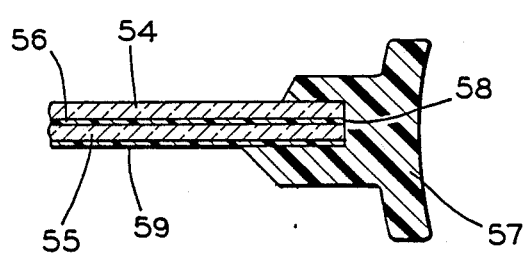
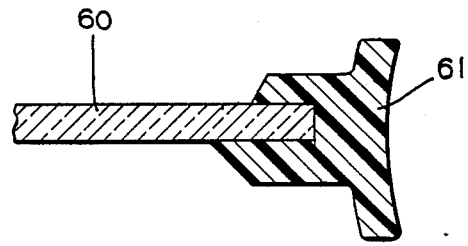
FIG. 10    FIG. 11

RETENTION SHIELD WINDOW ASSEMBLY AND METHOD OF MAKING THE SAME

BACKGROUND OF THE INVENTION

The present invention relates generally to a window assembly and, more particularly, to a movable vehicle window assembly including a transparent sheet functioning as a retention shield and an edge support attached along at least a portion of the periphery of the sheet.

Initially, fixed window assemblies for vehicles were comprised of a plurality of elements including adhesive sealants applied around the marginal edges of the glass sheet, suitable mechanical fasteners such as metal clips, and exterior decorative trim strips disposed to cover the junction between the marginal edges of the glass sheet and the adjacent portions of the vehicle frame. Such window structures were costly, especially from a labor standpoint, since it was necessary to assemble the individual elements along the vehicle assembly line.

Subsequently, in an endeavor to improve the above window structure, unitary window assemblies of the type illustrated in U.S. Pat. No. 4,072,340 were developed. These assemblies included a sheet of glass, an adjacent frame, and a casing or gasket of molded material, such as polyvinylchloride, extending between the frame and the peripheral edge of the window to hold the sheet of glass and the frame together. Fasteners were provided at spaced locations along the frame such that the entire assembly could be guided into location over the opening in a vehicle body as a unit. Other types of unitary window assemblies are disclosed in U.S. Pat. Nos. 3,759,004 and 4,364,595. While such unitary window structures greatly reduce the time required to mount the window assembly in the associated vehicle, such structures are relatively costly, since the individual components required to produce each window assembly generally must be manually assembled.

Moveable vehicle windows also presented problems, especially as the window glass became curved. Seals were typically attached to the door frames on either side of the channel in which the window traveled. In a hard top or convertible, a seal was typically attached to the leading edge of the rear window to engage the trailing edge of the door glass. Such window structures were costly to assemble and made it difficult to eliminate wind noise and leaking.

In the early stages of the automobile industry, single sheets of ordinary glass were employed as windshields. As it became evident that this type of windshield presented a considerable safety hazard, the single sheets of ordinary glass were replaced with single sheets of heat treated or tempered glass. Thereafter, as laminated safety glass was developed to reduce the severity of lacerative injuries, its use in automotive windshields greatly increased until today, when almost all automotive windshields are constructed of some type of laminated glass.

Typically, laminated glass of the type utilized in vehicle windshields consists of two sheets of glass bonded together with a thin plastic interlayer, such as a sheet of polyvinyl butyral, for example. In the event of an impact on a laminated glass windshield sufficient to break the glass, the plastic interlayer functions to bind the glass fragments together, thus reducing the risk of injury to a driver or passenger as a result of flying glass or contact with the windshield. Further developments with this type of laminated glass, such as those disclosed in U.S. Pat. No. 3,231,461, have resulted in laminated windshields with improved penetration resistance. Consequently, with the ever growing recognition of the necessity for increased safety precautions, continuing efforts have been and are still being made to appreciably reduce the injury producing potential of automobile windshields.

Recently, it has been found that an addition of a second plastic layer bonded to the inner glass surface of the laminated windshield further increases the safety effectiveness of the windshield. This second plastic layer has typically been termed a protective laceration inhibiting shield since it has been found that the additional plastic layer will appreciably reduce the number and severity of lacerative injuries to persons thrown against the windshield under all impact conditions. Further, it has been found that the laceration shield when produced under certain conditions of manufacture improves the ability of the laminated windshield to decelerate movement of the person thrown against the windshield, while also increasing the penetration resistance of the windshield as compared to conventional laminated windshields. Also, the laceration shield reduces the amount of flying glass and thus the injury to car occupants as a result of objects that may be thrown against the windshield from overpasses or elsewhere outside the vehicle.

An example of an automotive windshield which incorporates, as part of its laminated structure, a protective laceration shield bonded to its inboard glass surface is disclosed in U.S. Pat. No. 4,242,403. In this patent, the laceration shield includes a penetration resisting multi-layer body consisting of an inner layer of relatively soft, extensible plastic material such as polyvinyl butyral, for example, which is adhered to the inboard surface of the windshield, an intermediate layer of more durable plastic such as polyester, and an outer coating of an abrasion resistant material.

While anti-lacerative or retention shield window assemblies are commonly utilized in vehicle windshields, the side windows of a vehicle present a unique problem. Most side windows are required to be movable so that they can be raised and lowered in the window frame opening in a vehicle door or vehicle body. In order to seal between the window opening and the window assembly, one or more of various types of sealing means are utilized such as rubber or plastic gaskets. These gaskets would tend to mar and scratch the relatively soft retention shield material if such material were adhered to the inner surface of a moveable side window.

U.S. Pat. No. 4,490,942 discloses a vertically adjustable window panel which is arranged so as to be flush with the adjacent parts of the vehicle body and in which guide means and window sealing means therefor are disposed inboard of the window panel. A profiled sealing strip of rubber or plastic material extends about the frame on the top and opposed sides. A guide rail is attached to each of the vertical side edges of the window panel. The guide rail includes a guide arm which extends interiorally of the window panel and longitudinally of the window panel and is received within a recess formed by the window frame and the sealing means.

U.S. Pat. No. 4,494,337 discloses a motor vehicle side window assembly in which the door glass weather strip is provided on the door frame in such a manner that it contacts the interior surface of the door glass. A slide piece is attached to the edge of the door glass and engages a guide in the door frame to guide the door glass in a vertical direction. The outer surface of the door glass is substantially flush with the outer surface of the door frame.

U.S. Pat. No. 4,502,248 discloses a vehicle window assembly including a slidable window glass supported by and guided along only one edge of the glass. A pillar is secured to the vehicle door at one side of a window opening and forms a channel for slidably retaining a guide bonded to one edge of the window glass.

U.S. Pat. No. 4,561,211 discloses a pair of U-shaped guides formed on either side of a window frame in a vehicle door. A window pane has a pair of guides formed of plastic material and adhesively bonded to its inner surface. The guides each have a slot formed therein for engaging a portion of the U-shaped guides on the window frame to aid in the raising and lowering of the window assembly.

All of these window assemblies are relatively costly since the individual components required to produce each window assembly are numerous and generally must be manually assembled.

SUMMARY OF THE INVENTION

The present invention relates to a window assembly and a method of making the same wherein a movable vehicle window assembly is formed of a transparent sheet which functions as a retention shield and an edge support adhered to at least a portion of a periphery to cooperate with a window frame. The transparent sheet can include a sheet of glass having a retention shield layer adhered to an inner surface and an edge support adhered to the shield layer to produce a unitary movable window assembly. In the preferred embodiment of the invention, the edge support is formed by curing a multi-constituent polymeric gasket forming material in situ on a glass sheet to encapsulate the marginal peripheral edge portion of the sheet and a retention shield layer. The edge support is typically formed by a reaction injection molding process.

Also, a reinforcing device can be provided inside the edge support and preferably is encapsulated at the same time as the edge support is formed on the window. The edge support can have any of a plurality of different cross-sections for cooperation with various window guide means and sealing means typically mounted in a vehicle side window opening. In an alternate embodiment, the retention shield and the edge support can be molded at the same time from the same material on a glass sheet by a reaction injection molding process.

BRIEF DESCRIPTION OF THE DRAWINGS

The above, as well as other advantages of the present invention, will become readily apparent to those skilled in the art from the following detailed description of a preferred embodiment when considered in the light of the accompanying drawings, in which:

FIGS. 8-11 are enlarged fragmentary sectional views of a window assembly according to alternate embodiments of the present invention.

DESCRIPTION OF THE PREFERRED EMBODIMENT

Figure 1:
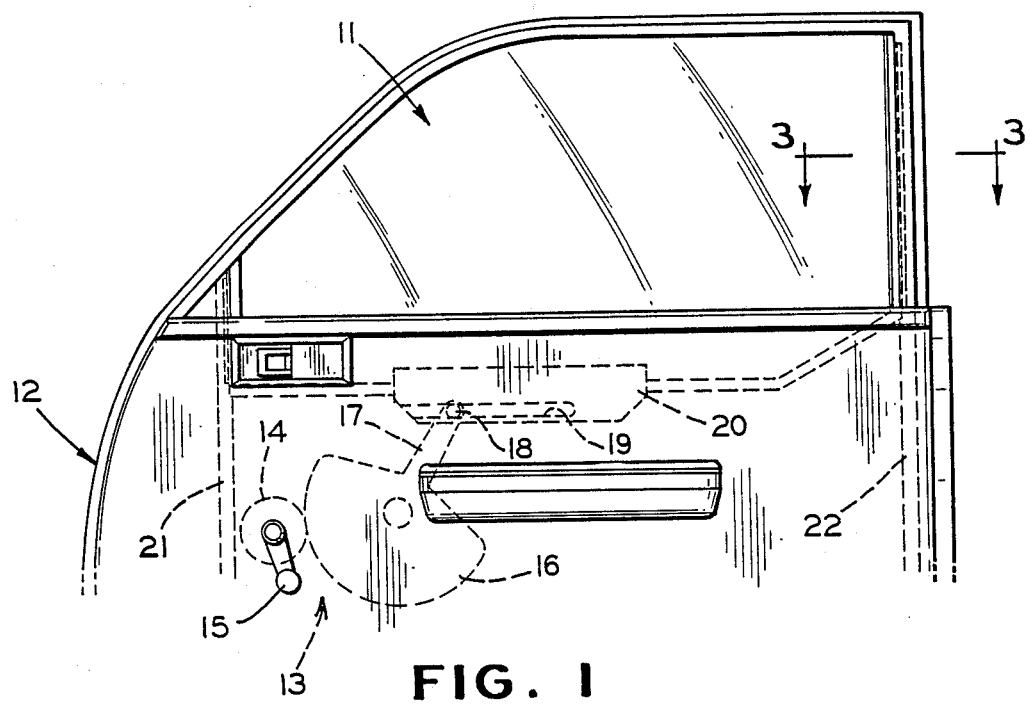
FIG. 1 is a front elevational view of a window assembly according to the present invention mounted in a vehicle door.

There is shown in FIG. 1 a window assembly 11 according to the present invention installed in a front door 12 of a vehicle (not shown). A window regulator mechanism 13 is provided in the door 12 to raise and lower the window assembly 11. The mechanism 13 can be of any conventional type and is shown in the raised position. For purposes of illustration, the mechanism shown includes a first gear 14 which is driven by a handle 15 rotatably supported on the inside of the door 12. The first gear 14 is in meshed engagement with a sector gear 16 rotatably supported by the door 12. The sector gear 16 includes an arm 17 which has a roller 18 attached to its distal end. The roller 18 is slidably received in a cam slot 19 formed in a sash plate 20 attached to the bottom of the window assembly 11.

When it is desired to move the window from its closed position, as shown in FIG. 1, toward its open position, the operator can rotate the handle 15 inside the car in a counterclockwise direction thereby rotating the first gear 14 in the same direction and rotating the sector gear 16 and its associated arm 17 in a clockwise direction. The clockwise rotation of the arm 17 forces the roller 18 toward the right hand end of the cam slot 19 thereby forcing the sash plate 20 and the attached window assembly 11 in a downward direction in the door 12. The front and rear edges of the window assembly 11 cooperate with guide rails or tracks 21 and 22 respectively which are parallel and extend in a generally vertical direction inside the front door 12. Of course, the window assembly 11 is raised by rotating the handle 15 in a clockwise direction.

Figure 2:
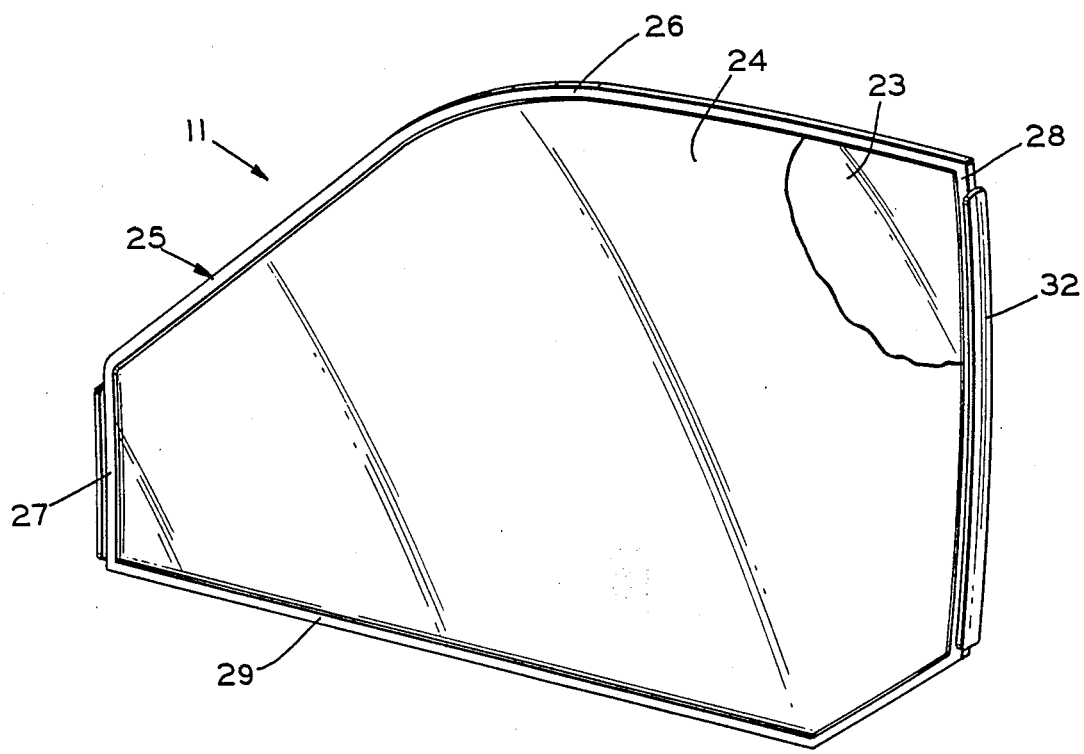
FIG. 2 is a perspective view of the window assembly shown in FIG. 1.

Referring to FIG. 2, the window assembly 11 includes a sheet of glass 23 having a retention shield 24 attached to its inner surface. A corner portion of the retention shield 24 is broken away to show the glass sheet 23. The retention shield 24 can be, for example, of the form of previously known laceration shields for windshields which includes a multi-layer body consisting of an inner layer of relatively soft, extensible plastic material such as polyvinyl butyral, for example, which is adhered to the inboard surface of the glass sheet 23, an intermediate layer of more durable plastic such as polyester, and an outer coating of an abrasion resistant material. Alternatively, the retention shield 24 can be formed of a monolithic plastic such as a polycarbonate or acrylic for reasons which will be discussed below.

As in an anti-lacerative windshield, the retention shield 24 prevents the pieces of a shattered glass sheet from falling out of the window opening and tends to retain passengers in the vehicle during impact. The retention function is especially effective in fixed side windows which are mounted in a frame. However, with moveable side windows mounted in guide rails, there would be a tendency for the window assembly to flex outwardly when pressure is applied thereby pulling the edges of the window assembly out of the guide tracks and allowing the window assembly to release from the vehicle. The tendency of a moveable anti-lacerative retention shield window assembly to release from a window opening upon impact is substantially reduced, according to the present invention, by the addition of an edge support 25 about all or a predetermined portion of the periphery of the window assembly 11.

Figure 3:
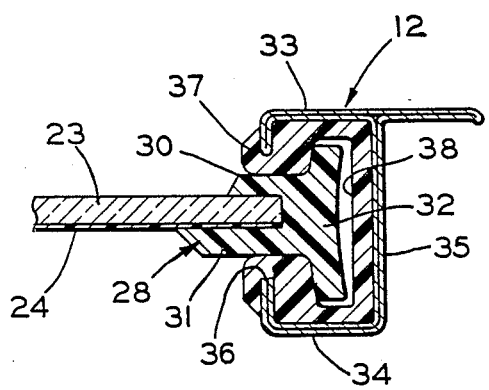
FIG. 3 is an enlarged fragmentary sectional view of the door frame and window assembly of FIG. 1 taken along the line 3—3 thereof.

As shown in FIG. 2 and FIG. 3, the edge support 25 includes an upper edge portion 26 connected at one end to an upper end of a forward edge portion 27 and connected at its other end to an upper end of a rear edge portion 28. The lower ends of the front edge portion 27 and the rear edge portion 28 are connected at opposite ends of a bottom edge portion 29 whereby the edge support 25 completely surrounds the periphery of the window assembly 11. As best seen in FIG. 3 in cross-section, the rear edge portion 28 includes an outer leg 30 extending along and adhered to an outer peripheral edge surface of the sheet of glass 23 and an inner leg 31 extending along and adhered to an inner peripheral edge surface of the retention shield 24. A main body 32 of the rear edge portion 28 is generally T-shaped in cross-section.

The door 12 in the area of the opening for the window assembly 11 is generally C-shaped facing the side edge of the window assembly 11. The door frame includes a sheet metal member which is folded on itself and then stamped into the configuration shown in FIG. 3 having an outer leg 33 and an inner leg 34 generally parallel and connected by a central portion 35. The legs 33 and 34 extend inwardly at the ends opposite central portion 35 to define an opening 36 through which the main body 32 of the rear edge portion 28 of the edge support 25 extends. A seal means 37 extends about the inner surface of the legs 33 and 34 and the central portion 35, and sealingly engages the outer surfaces of the outer leg 30 and the inner leg 31 of the rear edge portion 28. The opening 36 is smaller in width than the width of the T-shaped main body 32 such that the door frame tends to retain the rear edge portion 28 thereby preventing the window assembly 11 from separating from the front door 12. The seal means 37 is configured to form a channel or T-shaped track 38 for retaining the main body portion 32 of the rear edge portion 28 of the edge support 25.

Figure 4:
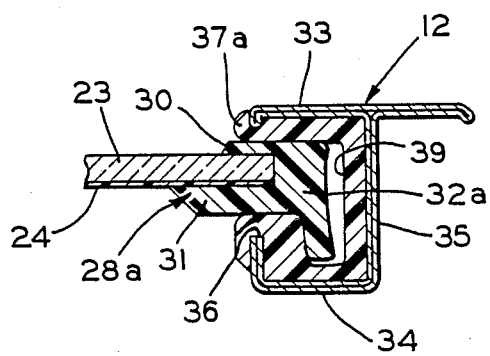
FIGS. 4-6 are enlarged fragmentary sectional views, similar to FIG. 3, of door frames and window assemblies according to alternate embodiments of the present invention.
Figure 5:
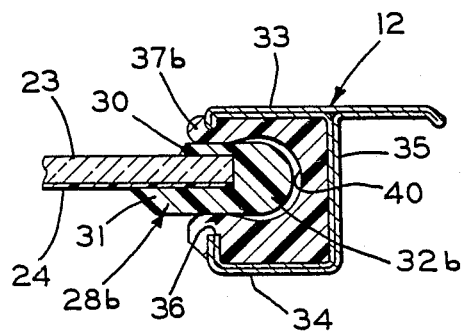
Figure 6:
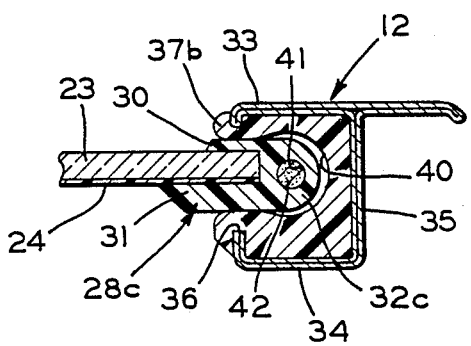

There is shown in FIGS. 4 through 6, several alternative embodiments of the present invention. In FIG. 4, the glass sheet 23 and retention shield 24 have a rear edge portion 28a attached to the peripheral edge of the window assembly 11. The outer leg 30 and the inner leg 31 extend from a main body 32a which has a generally L-shaped cross-section. The front door 12 defines a frame having the outer leg 33, the inner leg 34 and the central portion 35 defining the opening 36. Extending about an inner surface of the door frame is a seal means 37a which forms a generally L-shaped track or channel 39 for retaining the main body portion 32a of the rear edge portion 28a of the edge support. The rear edge portion 28a functions in much the manner as the rear edge portion 28 of FIG. 3 in retaining the window assembly 11 in the frame of the vehicle door 12.

In FIG. 5, there is shown a rear edge portion 28b having outer leg 30 and inner leg 31 extending from a generally semi-circular main body 32b. A seal means 37b extends about the inner walls of the outer leg 33, the inner leg 34 and the central portion 35 of the door frame. The seal means 37b forms a generally circular track or channel 40 which is open at the frame opening 36 to accept the main body 32b of the rear edge portion 28b.

In FIG. 6, the seal means 37b forms the circular track or channel 40 in the manner similar to the embodiment shown in FIG. 5. However, the rear edge portion 28c of the edge support includes a main body 32c from which the outer leg 30 and the inner leg 31 extend and having a longitudinally extending central aperture 41 formed therein. The central aperture 41 retains a reinforcing core 42. Typically, the reinforcing core 42 is a stranded wire made of metal or plastic fibers. Other suitable materials are glass or carbon fibers and the core 42 can be formed alternatively as a single strand.

Figure 7:
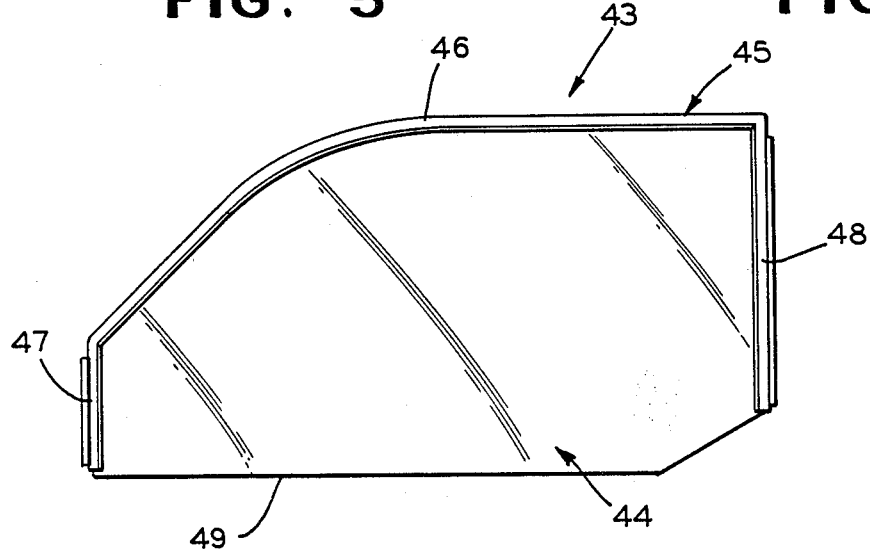
FIG. 7 is a front elevational view of a window assembly according to an alternate embodiment of the present invention with a predetermined portion of the periphery of the window encapsulated by an edge support.

In FIG. 7, there is shown a window assembly 43 according to an alternate embodiment of the present invention. The window assembly 43 includes a glass sheet and retention shield assembly 44 having an edge support 45 formed about a predetermined portion of its periphery. The edge support 45 includes an upper edge portion 46 connected at one end to an upper end of a front edge portion 47 and connected at an opposite end to an upper end of a rear edge portion 48. The portions 46, 47 and 48 are similar to the portions 26, 27 and 28 of the window assembly 11 shown in FIG. 2. However, since the frame surrounding a window opening in a door typically must be completely open at the bottom to accept that portion of the window assembly which is lowered into the lower portion of the door, there is no requirement for an edge support along a lower peripheral edge 49 of the window assembly 43. Also, since the portions 47 and 48 could be sufficient to retain the window assembly in a frame, the portion 46 could be eliminated.

Window assemblies including the edge supports according to the present invention can be formed in many different ways. For example, the glass sheet and retention shield can be assembled and the edge support can be formed as a separate element and then attached to the peripheral edge portion of the glass sheet/retention shield assembly. However, it may be preferable to form the edge support in situ about the periphery of the glass sheet/retention shield assembly in a mold in much the same manner as gaskets are formed about the periphery of windshields. Such a mold can be configured to accept the reinforcing core 42 along with the glass sheet/retention shield assembly for in situ encapsulation by the edge support. The edge support is formed of an elastomeric material such as polyvinylchloride or polyurethane. A mold structure for forming an edge support according to the present invention is disclosed in U.S. Pat. No. 4,561,625.

It is essential to the present invention that the edge support be connected to the retention shield to prevent the movable window assembly from releasing from a surrounding frame when pressure is applied to thereby prevent the ejection of a person from a vehicle. Molding the edge support onto the peripheral edge portion of the retention shield to adhere the edge support to the retention shield is one method of achieving the required connection. In FIG. 8, there is shown an alternate embodiment wherein a window assembly includes a transparent sheet 50 having a molded assembly 51 formed therewith. The assembly 51 includes a retention shield portion 52 adhered to an inner surface of the transparent sheet 50 and an edge support portion 53. The retention shield portion 52 and the edge support portion 53 are connected by molding them together as a unitary assembly. A polyurethane material can be utilized in a reaction injection molding process. The single sheet of material 52 is the equivalent of the retention shield 24 discussed above.

FIG. 9 shows another alternate embodiment of the present invention wherein a window assembly includes an outer transparent sheet 54 and an inner transparent sheet 55 separated by an intermediate layer of material 56 such as polyvinyl butyral. An edge support 57 is formed about the periphery of the sheets 54 and 55 and is connected to the intermediate layer 56 at an interface 58. The layer 56 functions as a retention shield for the sheets 54 and 55. The window assembly shown in FIG. 9 could also include a retention shield 59 adhered to an inner surface of the transparent sheet 55 and connected to the edge support 57 as shown in FIG. 10.

Finally, there is shown in FIG. 11 another alternate embodiment of the present invention. A transparent sheet 60 has an edge support 61 adhered to at least a portion of a peripheral edge thereof. The sheet 60 is formed of a material, such as a polycarbonate or acrylic, which is strong enough not to shatter and/or flex excessively thereby functioning as a retention shield.

In accordance with the provisions of the patent statutes, the principle and mode of operation of the present invention have been described in what is considered to represent the preferred embodiment. However, it should be understood that the invention may be practiced otherwise than as specifically illustrated and described without departing from its spirit or scope.

What is claimed is:

1. A movable window assembly for cooperation with a window frame defining an opening having a seal comprising:
   a sheet of transparent material including a retention sheet formed of a plastic material, said retention sheet extending to a predetermined portion of a periphery of said sheet of transparent material; and
   an edge support connected to said retention sheet and adhered to at least a predetermined portion of a peripheral edge of said sheet of transparent material, and having a main body, said main body and said peripheral edge of said sheet of transparent material adapted to extend into and slidably engage a channel formed in a window frame seal for movement of said sheet of transparent material and said edge support along thee channel, said main body having a cross-sectional shape and area substantially the same as a cross-sectional shape and area of the channel whereby when pressure is applied tending to force said sheet of transparent material from a window opening defined by the window frame, said edge support main body cooperates with the channel and retains said sheet of transparent material in the window frame.

2. The window assembly according to claim 1 wherein said sheet of transparent material includes a sheet of glass adhered to said retention sheet.

3. The window assembly according to claim 1 wherein said edge support main body is T-shaped in cross-section.

4. The window assembly according to claim 1 wherein said edge support main body is L-shaped in cross-section.

5. The window assembly according to claim 1 wherein said edge support main body is semi-circular in cross-section.

6. The window assembly according to claim 1 wherein said edge, support is formed of an elastomeric material.

7. The window assembly according to claim 6 wherein said elastomeric material is a polyvinylchloride material.

8. The window assembly according to claim 6 wherein said elastomeric material is a polyurethane material.

9. The window assembly according to claim 1 wherein said edge support main body has a central reinforcing core formed of a material different from the material of the remainder of said edge support.

10. The window assembly according to claim 9 wherein said edge support is formed of an elastomeric material and said central reinforcing core is formed of one of glass, carbon, metal and plastic.

11. The window assembly according to claim 9 wherein said central reinforcing core is a multi-strand wire.

12. A movable window assembly for use in a vehicle comprising:
    a sheet of transparent material including a retention shield formed of a plastic material and extending to a predetermined portion of a periphery of said sheet of transparent material; and
    an edge support adhered to at least a predetermined portion of a peripheral edge at said predetermined portion of a periphery of said sheet of transparent material, said edge support having a pair of generally parallel legs extending from a main body portion, said legs being adhered to opposite surfaces of said sheet of transparent material and said main body portion adapted to slidably engage a channel formed in a seal for a vehicle window opening frame for movement of said sheet of transparent material and said edge support in the channel, said main body portion having a cross-sectional shape and size substantially the same as a cross-sectional shape and size of the channel whereby said main body portion cooperates with the channel and retains said sheet of transparent material in the window frame when pressure is applied to said sheet tending to force said sheet from the window frame.

13. The window assembly according to claim 12 wherein said sheet of transparent material includes a sheet of glass, said retention shield is adhered to said sheet of glass and said edge support is formed of an elastomeric material.

14. The window assembly according to claim 13 wherein said main body portion is T-shaped in cross-section.

15. The window assembly according to claim 13 wherein said retention sheet is formed of a polycarbonate material.

16. The window assembly according to claim 13 wherein said retention sheet is formed of an acrylic material.

17. The window assembly according to claim 13 wherein said main body portion of said edge support includes a reinforcing coreformed of a material other than an elastomeric material.

18. The window assembly according to claim 17 wherein said reinforcing core is a multi-strand wire.

19. The window assembly according to claim 13 wherein said sheet of transparent material includes a pair of sheets of glass adhered to opposite sides of said retention sheet.

20. The window assembly according to claim 17 wherein another retention sheet is adhered to one of said glass sheets.

* * * * *